United States Patent [19]
Fischer

[11] Patent Number: 5,256,924
[45] Date of Patent: Oct. 26, 1993

[54] SUPERCONDUCTING COMMUTATOR FOR DC MACHINES

[75] Inventor: Richard L. Fischer, Rolling Hills Estates, Calif.

[73] Assignee: Allied-Signal Inc., Morris Township, Morris County, N.J.

[21] Appl. No.: 927,902

[22] Filed: Aug. 10, 1992

[51] Int. Cl.$^5$ ............................................. H02K 13/00
[52] U.S. Cl. ........................................ 310/233; 310/10; 310/52; 310/68 B; 310/156; 310/177; 505/878
[58] Field of Search ................ 310/233, 184, 156, 688, 310/254, 468 E, 10, 40 R, 52, 177; 505/800, 852, 876, 878; 200/144 AP

[56] References Cited

U.S. PATENT DOCUMENTS

| | | |
|---|---|---|
| 2,614,171 | 10/1952 | Fein . |
| 2,924,633 | 2/1960 | Sichling et al. . |
| 3,305,717 | 2/1967 | Weiss . |
| 3,305,819 | 2/1967 | Brice et al. . |
| 3,359,522 | 12/1967 | Albrecht et al. . |
| 3,366,909 | 1/1968 | Hini et al. . |
| 3,611,113 | 10/1971 | Cherry ........................ 310/10 UX |
| 3,704,391 | 11/1972 | McConnell ................. 200/144 AP |
| 3,909,684 | 9/1975 | Smith, Jr. ............................ 505/852 |
| 4,053,829 | 10/1977 | Maruo . |
| 4,385,246 | 5/1983 | Schur et al. ......................... 310/10 |
| 4,464,617 | 8/1984 | Yantovsky et al. ................ 505/852 |
| 5,177,054 | 1/1993 | Lloyd et al. ......................... 310/10 |

FOREIGN PATENT DOCUMENTS 46-34536 9/1967 Japan .

*Primary Examiner*—Robert Skudy
*Attorney, Agent, or Firm*—Hugh P. Gortler; James W. McFarland; Robert A. Walsh

[57] ABSTRACT

A commutator employs superconducting switches to commutate currents in the field stator of a dc machine. The switches couple the machine's stator windings to a DC link. The switches are exposed to magnetic fields of alternating strengths, turning on and off in a sequence that maintains a constant torque angle between the stator's mmf vector and the flux vector of the machine's rotor or that rectifies a current induced into the stator by the machine's rotor.

14 Claims, 2 Drawing Sheets

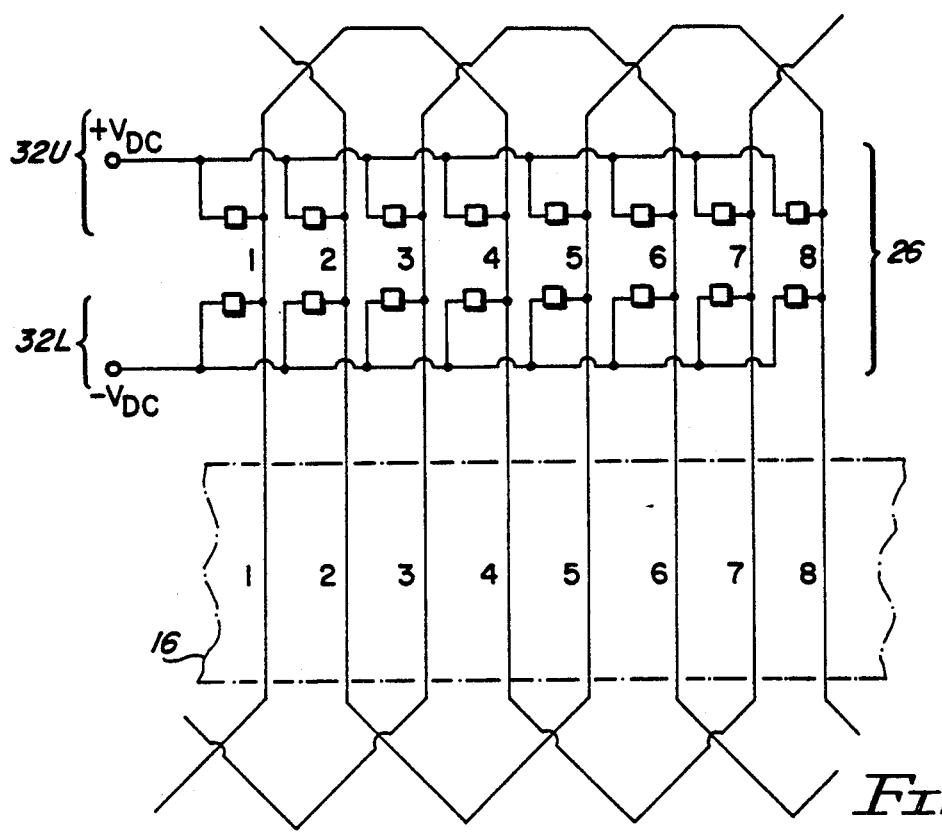
FIG-3
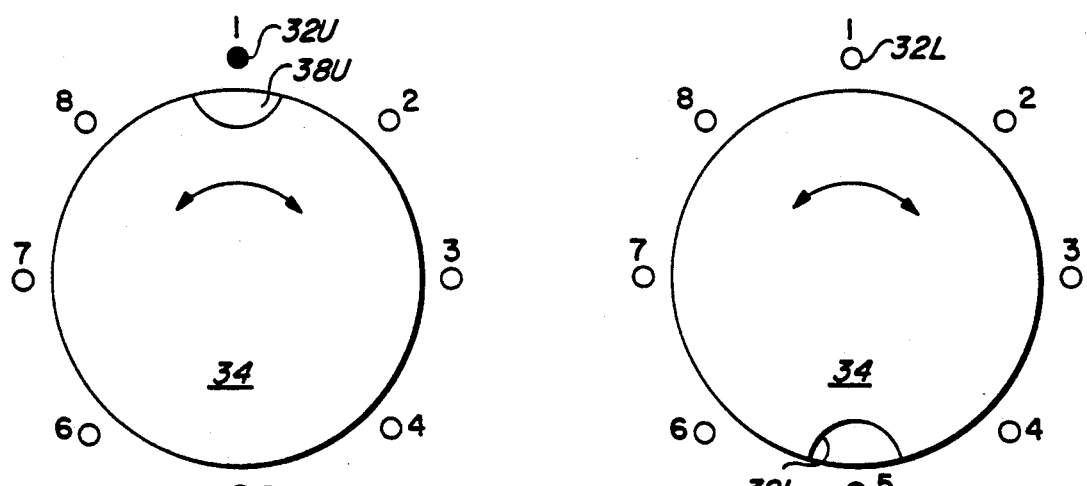
LEGEND:
○ OPEN SWITCH
● CLOSED SWITCH
FIG-4a
FIG-4b
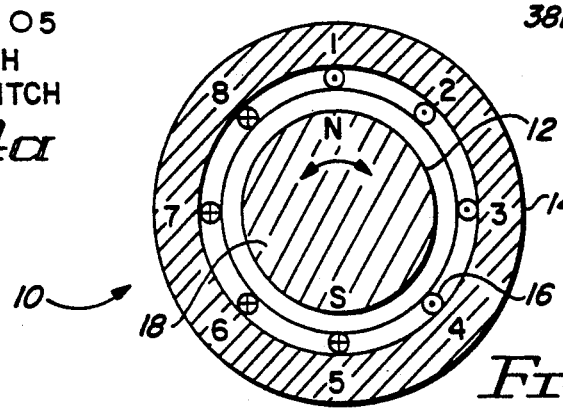
FIG-5

SUPERCONDUCTING COMMUTATOR FOR DC MACHINES

BACKGROUND OF THE INVENTION

This invention relates to commutators for dc machines.

A conventional dc machine comprises an armature and a stator. The armature includes a shaft, a core of slotted steel laminations which are rotated by the shaft, and copper windings which are inserted in the slots. The stator includes a number of field windings which surround the armature. When the field windings are energized, the resulting stator flux cuts through the laminations of the rotor. Because the stator is stationary, its mmf vector is fixed in space.

When the dc machine is operated as a motor, the armature windings are selectively energized such that the resulting armature mmf vector is maintained at a torque angle of 90° (quadrature) with the stator's mmf vector. Because the stator mmf vector is fixed in space, the armature mmf vector must also be held stationary. To keep the armature mmf vector stationary while the armature rotates, the polarity of flux lines from the armature must be continuously reversed.

Polarity of the flux lines is reversed by changing direction of the current in the armature windings. The direction is changed by a commutator, which consists of conductive bars that are insulated from each other. The start of each armature winding is connected to one bar, and the finish is connected to another bar. Brushes, urged against the surface of the commutator, carry current to the commutator bars. As the armature rotates, different bars contact the brushes, whereby the direction of current in the armature windings is reversed to keep the armature mmf vector in quadrature with the stator mmf vector.

With time and usage, the brushes wear down and the commutator surfaces run out. Therefore, the brushes must be replaced; otherwise, the motor runs noisier and eventually fails. Further, worn brushes emit electrical interference caused by arcing. The arcing also causes undesirable effects such as acoustic noise and sparking.

These problems have been overcome by recent advances in dc motor designs. In newer brushless dc motors, the armature is replaced by a permanent magnet rotor and the commutators and brushes are replaced by power transistors and electronic control circuitry. By modulating the power transistors, the direction of current can be commutated in the stator windings, causing the stator mmf vector to rotate. Thus, commutation is performed electronically instead of mechanically. As a result of these advances, the brushless dc motor has become dominant in servo motor applications such as robotics and machine tools.

SUMMARY OF THE INVENTION

The problems associated with conventional commutators are also overcome by a commutator according to the present invention, which commutates currents in the field stator of a dc machine having a permanent magnet rotor. The commutator comprises first and second pluralities of members made of a superconducting material. The members lose their superconductivity when exposed to magnetic fields above a critical magnetic field. Each member in the first plurality couples an associated commutation point on the stator to a dc link high, and each member in the second plurality couples an associated commutation point to a dc link return. The commutator further includes magnetic means for exposing the members to a first magnetic field that is greater than said critical magnetic field and to a second magnetic field that is less than said critical magnetic field. The members function as switches. By exposing the members to the rotating magnetic fields, they are turned on and off in a sequence that maintains a constant torque angle between the stator mmf vector and the rotor flux vector when the machine is operated as a motor, or that rectifies a current induced into the stator by the rotor when the machine is operated as a generator.

BRIEF DESCRIPTION OF THE DRAWINGS

FIG. 3 is a wiring diagram for the commutator and field stator of the dc machine;

FIGS. 4a and 4b are state diagrams of upper and lower sets of superconducting switches for the commutator; and FIG. 5 depicts the direction of currents flowing through the field stator of the dc machine.

DETAILED DESCRIPTION OF THE PREFERRED EMBODIMENTS

Figure 1:
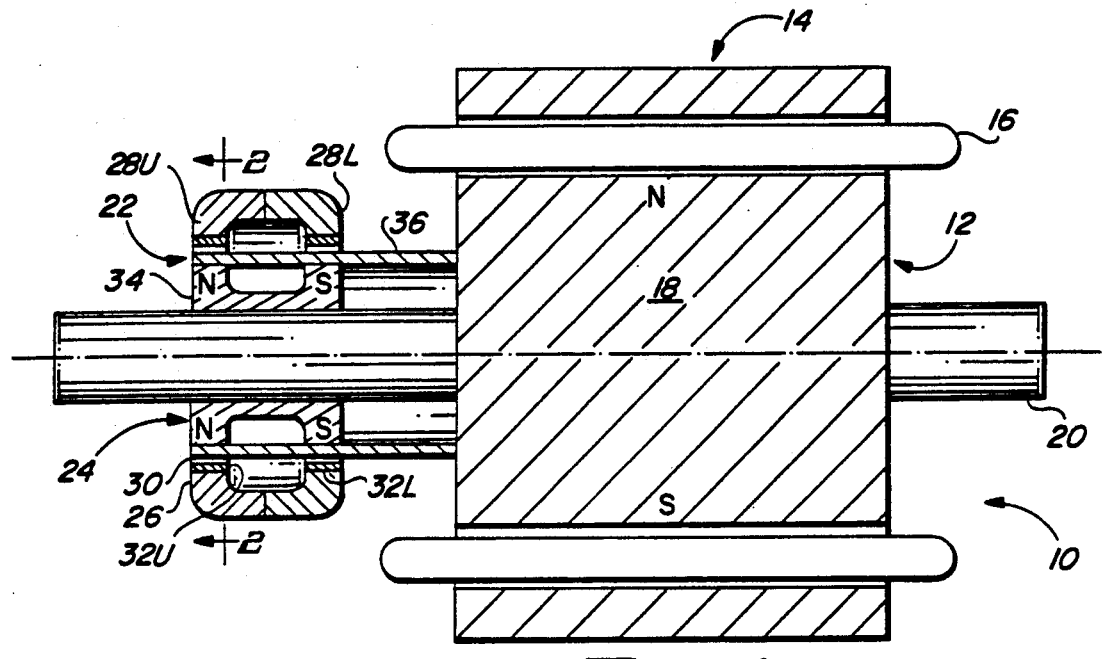
FIG. 1 depicts a dc machine according to the present invention, its commutator being shown in partial cross-section.

FIG. 1 shows a dc machine 10 having a rotor 12 and a field stator 14 whose windings 16 surround the rotor 12. The rotor 12 includes a cylindrical permanent magnet 18, magnetized radially, and a shaft 20 secured for rotation with the magnet 18. By way of example, the magnet 18 is described as having two poles, and the stator 14 is described as having two phase windings 16.

Current is commutated through the stator windings 16 by a commutator 22. When the dc machine 10 is operated as a generator, the commutator 22 rectifies current induced in the stator windings 16 by the rotor's rotating flux vector. When the dc machine 10 is operated as a motor, the commutator 22 energizes the stator field windings 16 to maintain a constant torque angle between the stator mmf vector and rotor flux vector.

Figure 2:
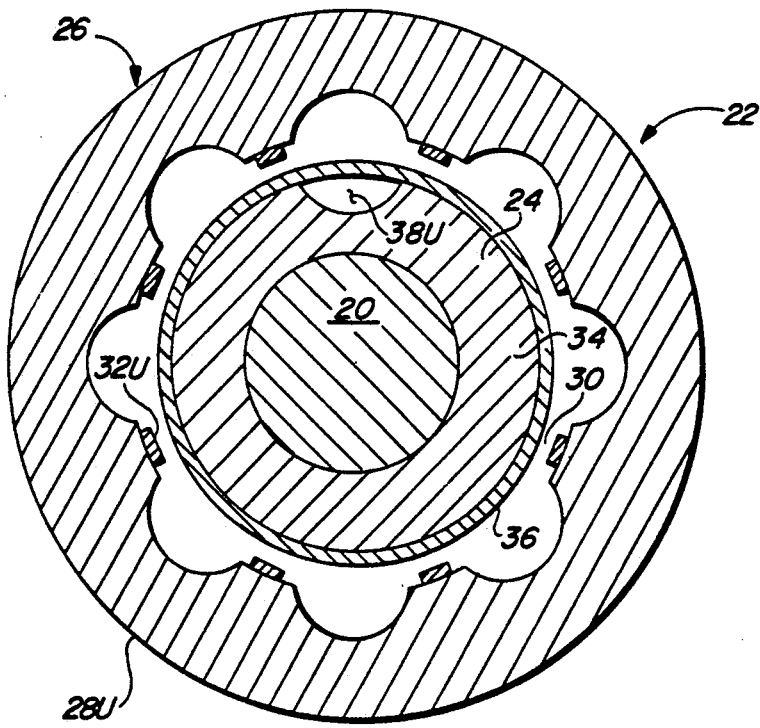
FIG. 2 is a cross-sectional view of the commutator, taken along lines II—II in FIG. 1.

Referring additionally to FIG. 2, the commutator 22 includes a rotor 24 and a stator 26. The commutator stator 26 has first and second annular sidewalls 28U and 28L which are adjustably attached to the motor stator 14. Both sidewalls 28U and 28L surround the commutator rotor 24 to form an air gap 30. A set of eight upper switches 32U is bonded to the first sidewall 28U, and a set of eight lower switches 32L (FIG. 1) is bonded to the second sidewall 28L. Both sets of switches 32U and 32L are located in the air gap 30 and are disposed equiangularly about their respective sidewalls 28U and 28L.

Each switch 32U and 32L is made of a superconducting material, either Type I or Type II. When cooled below a critical temperature $T_c$ and exposed to a magnetic field below a critical field $H_{C1}$, both Type I and Type II superconductors carry current with little or no dc resistance. When the applied magnetic field exceeds the critical field $H_{C1}$, the Type I material loses its superconductive properties. By contrast, the Type II superconductor loses its superconductive properties only when the applied magnetic field exceeds an upper critical field $H_{C2}$.

The commutation rotor 24 includes a cylindrical permanent magnet 34 which is secured to the shaft 20. Thus, the commutation magnet 34 rotates conjointly with the motor rotor 12. Magnetized axially, the commutation magnet 34 must have a high energy product to produce a strong magnetic field across the air gap 30. A rare-earth magnet has such an energy product. When rotated at high speeds, the commutation magnet 34 must be surrounded by a non-magnetic retaining sleeve 36. A material such as INCONEL 718 can withstand stresses arising from the high rotational speeds. The shape of the commutation magnet 34 is designed to concentrate the magnetic field at the switches 32U and 32L. This is desirable to strengthen the magnetic field locally to the required critical field $H_{C1}$ or $H_{C2}$, above which the switches 32U and 32L lose their superconductivity.

The commutation magnet 34 is pocketed at two regions 38U and 38L (see also FIGS. 4a and 4b) to produce areas of reduced magnetic field (below the required critical field intensity $H_{C1}$ or $H_{C2}$). Switches exposed to this low magnetic field are returned to their superconducting condition. Thus, as the commutation rotor 34 is rotated, the switches 32U and 32L are turned off when exposed to the high magnetic field and turned on when exposed to the reduced magnetic field. The pocket regions 38U and 38L (FIG. 4b) are diametrically opposed and axially spaced apart.

Referring now to FIG. 3, the sets of upper and lower switches 32U and 32L are electrically connected to commutation points 1–8 on the field stator winding 16. The upper switches 32U are connected between their respective commutation points 1–8 and a DC link high $+V_{DC}$, and the lower switches 32L are connected between the commutation points 1–8 and a DC link return $-V_{DC}$.

FIGS. 4a and 4b show the states of the upper and lower switches 32U and 32L when the commutation magnet 34 is rotated. Because the pocket regions 38U and 38L are diametrically opposed, diametrically opposed upper and lower switches are turned on at the same time. Thus, the upper switch 32U connected to the first commutation point 1 and lower switch 32L connected to the fifth commutation point 5 conduct at the same time. The directions of the field stator currents for these states are shown in FIG. 5 (symbol "+" denotes current flowing out of the page, and symbol "•" denotes current flowing into the page). As the commutation magnet 34 continues to rotate, the upper and lower switches 32U and 32L connected to the first and fifth commutation points 1 and 5, respectively, are turned off, and the upper and lower switches 32U and 32L connected to the second and sixth commutation points 2 and 6, respectively, are turned on, followed by the upper and lower switches 32U and 32L connected to the third and seventh commutation points 3 and 7, respectively, the upper and lower switches 32U and 32L connected to the fourth and fifth commutation points 4 and 5, respectively, and so on. Thus, the opposing upper and lower switches 32U and 32L are changed in synchronism to the position of the commutation magnet 34. This action maintains the stator mmf vector at a constant torque angle with the magnetic flux vector of the motor's rotor 12, or it produces a constant, unidirectional current on the DC link $+V_{DC}$ and $-V_{DC}$.

The torque angle between the stator mmf vector and rotor flux vector can be adjusted by rotating the sidewalls 28U and 28L relative to one another. This adjustment can be made during assembly of the dc machine 10.

Although the switches 32U and 32L can be made of either Type I or Type II superconducting material, the Type I material is preferred because it makes a direct transition from a superconductive state to a non-superconductive state.

The dc machine 10 offers several advantages over the prior art. The dc machine 10 does not employ brushes; therefore, it does not suffer from the problems attributed to conventional commutators. Its commutator 22 employs switches 32U and 32L that are capable of switching rapidly and doing so with little loss. Thus, the switches 32U and 32L can be operated at high frequencies, i.e., employed in applications requiring high rotational speeds. The switches 32U and 32L are limited only by the critical current density of the superconducting material. Because the switches must be operated at extremely low temperatures (e.g., 77° K.), the commutator 22 is best suited for cryogenic environments. Further, the dc machine 10 does not require position sensors or control circuitry, which is required for dc brushless machines. Resulting is a reduction in cost, size and weight over dc machines of the prior art.

In another embodiment of this invention, the switches 32U and 32L are employed as rotor proximity sensors in a conventional brushless dc machine, sensing the position of the rotor with respect to the field stator windings. The resulting position signals are supplied to electronic control circuitry.

It will be understood that the embodiments described herein are merely exemplary and that a person skilled in the art may make many modifications and variations without departing from the spirit and of the present invention. All such modifications are intended to be included within the scope of the present invention as defined by the appended claims.

I claim:

1. A commutator for commutating current in field windings of a dc machine having a dc link high and a dc link return, said commutator, comprising:

first and second pluralities of members made of a superconducting material that loses its conductivity when exposed to a magnetic field above a critical magnetic field, each member in said first plurality coupling a commutation point on said windings to said dc link high, each member in said second plurality coupling a commutation point on said windings to said dc link return; and magnetic means for generating a first magnetic field that is greater than said critical magnetic field and a second magnetic field that is less than said critical magnetic field, said members of said first and second pluralities being exposed to said first and second magnetic fields in a sequence that causes said current to be commutated in said field windings.

2. The commutator of claim 1, wherein said magnetic means includes:

a cylindrical commutator magnet for providing said first magnetic field except for first and second pocket regions that provide said second magnetic field;

a commutator stator surrounding said commutator magnet to support said members such that said first plurality can communicate with said first pocket region and said second plurality can communicate with said second pocket region, said members being disposed within an air gap between said commutator stator and said commutator magnet; and rotating means for rotating said commutator magnet, whereby said members are exposed to said first and second magnetic fields in said sequence.

3. The commutator of claim 2, wherein said dc machine includes a rotor surrounded by said field windings, and wherein said commutator magnet is secured to a shaft extending from said rotor, whereby said shaft functions as said rotating means.

4. The commutator of claim 3, wherein said commutator stator includes a first sidewall for supporting said first plurality of members about said commutator magnet and a second sidewall for supporting said second plurality of members about said commutator magnet.

5. The commutator of claim 4, wherein said sidewalls are adjustable relative to one another.

6. The commutator of claim 2, wherein said first and second pocket regions are axially spaced apart on said commutator magnet.

7. The commutator of claim 4, wherein said commutator magnet is shaped to concentrate said first and second magnetic fields at said first and second sidewalls.

8. The commutator of claim 2, wherein said commutator magnet is an axially magnetized rare earth, permanent magnet and wherein said pocket regions are diametrically opposed and axially spaced apart.

9. The commutator of claim 1, wherein each said member is made of a Type I superconducting material.

10. A commutator for commutating currents in field windings of a dc machine having a rotor, a dc link high and a dc link return, said commutator comprising:

first and second pluralities of switches made of a superconducting material that loses its conductivity when exposed to a magnetic field above a critical magnetic field, each switch of said first plurality coupling a commutation point on said field windings to said dc link high, each switch of said second plurality coupling a commutation point on said field windings to said dc link return;

an axially-magnetized cylindrical permanent magnet, rotated by said rotor, providing a first magnetic field that is stronger than said critical magnetic field, except for first and second pocket regions which provide a second magnetic field that is weaker than said critical magnetic field, said first and second pocket regions being axially spaced apart; and a commutator stator having first and second sidewalls that form an air gap about said permanent magnet, said first sidewall disposing said first plurality of switches within said air gap and about said permanent magnet for communication with said first pocket region, said second sidewall disposing said second plurality of switches within said air gap and about said permanent magnet for communication with said second pocket region.

11. The commutator of claim 10, wherein said first and second sidewalls are adjustable relative to one another.

12. The commutator of claim 10, wherein said magnet is shaped to concentrate said magnetic fields at said first and second sidewalls.

13. The commutator of claim 10, wherein said magnet is a rare earth magnet.

14. The commutator of claim 10, wherein each said switch is made of a Type 1 superconducting material.

* * * * *